United States Patent [19]

Park

[11] Patent Number: 5,743,998

[45] Date of Patent: Apr. 28, 1998

[54] PROCESS FOR TRANSFERRING MICROMINIATURE PATTERNS USING SPIN-ON GLASS RESIST MEDIA

[75] Inventor: Sun Woo Park, Palo Alto, Calif.

[73] Assignee: Park Scientific Instruments, Sunnyvale, Calif.

[21] Appl. No.: 424,960

[22] Filed: Apr. 19, 1995

[51] Int. Cl.$^6$ ........................................................ G03F 7/00
[52] U.S. Cl. ............................ 156/628.1; 156/659.1; 216/87; 216/51; 430/296; 430/325; 430/326
[58] Field of Search ............................ 156/628.1, 659.1; 216/87, 62; 430/325, 326, 296, 323

[56] References Cited

U.S. PATENT DOCUMENTS

| | | | |
|---|---|---|---|
| 3,935,332 | 1/1976 | Poliniak et al. | 430/326 X |
| 5,003,062 | 3/1991 | Yen | 437/231 |
| 5,328,807 | 7/1994 | Tanaka et al. | 430/311 |
| 5,362,591 | 11/1994 | Imai et al. | 430/323 X |

FOREIGN PATENT DOCUMENTS

| | | |
|---|---|---|
| 58-35929 | 3/1983 | Japan . |

OTHER PUBLICATIONS

Tadashi Nakano, Kyoji Tokunaga, and Tomohiro Ohta.; "Relationship between Chemical Structure and Film Properties of Organic SOG"; LSI Research Laboratories; pp. 11–12.

Victor Comello; "Planarizing Leading Edge Devices"; Semiconductor International, Nov. 1990; pp. 60–66.

C.R.K. Marrian, F.K. Perkins, S.L. Brandow, T.S. Koloski, E.A. Dobisz, and J.M. Calvert; "Low Voltage Electron Beam Lithography in Self-assembled Ultrathin Films with the Scanning Tunneling Microscope"; Applied Physics Letter, Jan. 1994; pp. 390–392.

Christie R.K. Marrian and Elizabeth A. Dobisz; "Electron-beam Lithography with the Scanning Tunneling Microscope"; J. Vac. Sci. Technology B. Nov./Dec. 1992; pp. 2877–2891.

C.R.K. Marrian and E.A. Dobisz; "Investigations of Underdeveloped E–beam Resist with a Scanning Tunneling Microscope"; J. Vac. Sci. Technol. B., Mar./Apr. 1991; pp. 1367–1370.

H. Zhang, L.S. Hordon, S.W.J. Kuan, P. Maccagno, and R.F.W. Pease; "Exposure of Ultrathin Polymer Resists With the Scanning Tunneling Microscope"; J. Vac. Sci. Technol. B7, Nov./Dec. 89; pp. 1717–1722.

J.W. Lyding, T–C. Shen, J.S. Hubacek, J.R. Tucker, and G.C.Abeln; "Nanoscale Patterning and Oxidation of H–passivated Si(100)–2X1 Surfaces with an Ultrahigh Vacuum Scanning Tunneling Microscope"; Appl. Phys. Lett 65 (15), Apr. 1994; pp. 2010–2012.

E.S. Snow and P.M. Campbell; "Fabrication of Si Nanostructures with an Atomic Force Microscope"; Appl. Phys. Lett 64 (15), Apr. 1994; pp. 1932–1934.

Dawen Wang, Liming Tsau, and K.L. Wang; "Nanometer-structure Writing on Si(100) Surfaces Using a Non-contact-mode Atomic Force Microscope"; Appl. Phys. Lett. 65 (11); Sep. 1994; pp. 1415–1417.

(List continued on next page.)

*Primary Examiner*—Thi Dang
*Attorney, Agent, or Firm*—Wilson Sonsini Goodrich & Rosati

[57] ABSTRACT

A process is provided for altering the susceptibility of a portion of a Spin-On Glass layer to etching. The process includes taking a substrate including a layer of positive or negative resist Spin-On Glass and exposing a portion of the Spin-On Glass layer to an electric field or an electron beam. Depending on the particular Spin-On Glass used, exposure of a portion of the Spin-On Glass layer to the electric field or electron beam causes the exposed portion to have either significantly enhanced or reduced susceptibility to etching as compared to the unexposed portion. This enables the exposed and unexposed portions to be differentiated by selectively removing the more etch susceptible portions of the Spin-On Glass layer during development.

54 Claims, 9 Drawing Sheets

OTHER PUBLICATIONS

S.C. Minne, H.T. Soh, PH. Flueckiger, and C.F. Quate; "Fabrication of 0.1 μm Metal Oxide Semiconductor Field-effect Transistors with the Atomic Force Microscope"; Appl. Phys. Lett. 66 (6), Feb. 1995; pp. 703–705.

G.C. Rosolen, A.C.F. Hoole, M.E. Welland, and A.N. Broers; "Integrated Nanofabrication with the Scanning Electron Microscope and Scanning Tunneling Microscope"; App. Phys. Lett. 63 (17) Oct. 1993; pp. 2435–2437.

M.A. McCord and R.F.W. Pease; "Exposure of Calcium Floride Resist with the Scanning Tunneling Microscope"; J. Vac. Sci. Technol. B 5 (1), Jan./Feb. 87; pp. 430–433.

M. Enachescu, E. Hartmann, and F. Koch; "Writing Electronic Nanometer Structures Into Porous Si Films by Scanning Tunneling Microscope"; Appl. Phys. Lett 64 (17), Apr. 1994; pp. 2253–2255.

F. Thibaudau, J. R. Roche, and F. Salvan; "Nanometer–scale Lithography on Si surface by Decomposition of Ferrocene Molecules Using a Scanning Tunneling Microscope"; Appl. Phys. Lett. 64 (4), Jan. 1994; pp. 523–525.

E.E.Ehrichs, S. Yoon and A.L. De Lozanne; "Direct Writing of 10 nm. Features with the Scanning Tunneling Microscope"; Appl. Phys. Lett. 53 (23) Dec. 1988; pp. 2287–2289.

D. Liu, R.B. Marcus; "Characterization of Silicon Field Emission Microtriodes"; pp. 672–675.

S.C. Minne, PH. Flueckiger, H.T. Soh, and C.F.Quate; "Parallel Imaging and Parallel Lithography with an Atomic Force Microscope"; Avs. Proc. of Nano3, 1994; pp.1–22.

PROCESS FOR TRANSFERRING MICROMINIATURE PATTERNS USING SPIN-ON GLASS RESIST MEDIA

FIELD OF THE INVENTION

The present invention relates to a process for transferring a microminiature pattern. More specifically, the present invention relates to the use of Spin-On Glass in a process for transferring a microminiature pattern.

BACKGROUND OF THE INVENTION

A variety of applications exist requiring the transfer of a microminiature pattern. Examples of such applications include, but are not limited to patterning semiconductor devices, patterning photomasks, optical lithography, creating microdots, media storage, printing, photography and the creation of holographic images. It is a continuing objective in the art to reduce the minimum pattern size that may be transferred and to reduce the time needed to transfer the pattern.

The minimum pattern size currently produced by conventional optical lithography is limited by the wave length of the light source used to pattern the resist layer. A need exists for a technique which can further reduce the minimum pattern size that may be achieved. In particular, there is a need for a process for producing submicron width pattern lines.

Many attempts have been made to produce line widths of 0.1 µm and less using scanning electron microscopes (SEM) and X-rays. However, serious proximity effects as well as the complexity associated with providing a vacuum environment prevent these techniques from becoming practical pattern transferring processes.

In the case of lithography, the minimum pattern size that may be achieved depends on the exposure conditions and the resist media processing conditions. In scanning electron lithography, the exposure conditions depend on the incidence angle of the electron beam, the degree of scattering of the electron beam and the beam size. Scattering of the incidence electron beam is caused by aberration and accretion of the electron beam during acceleration and focusing. Scattering of the incidence electron beam produces proximity effects that change the size and shape of the pattern when two patterns are adjacent to each other.

The processing conditions in SEM lithography include the surface topography of the resist layer and the baking conditions. The thickness of a coated resist media varies depending on the geometry of the underlying structure, making it difficult to control the final shape of the pattern. Typical resist media need to be baked before exposure and after development. Due to shrinkage of the resist media during such thermal processes, the size and shape of the final pattern depends on both the pre-bake and post-bake conditions.

Recently, scanning probe microscopes (SPM) have been used to perform lithography on silicon wafers. The probe tip of an SPM produces a highly localized strong electric field which creates an electron beam using low voltage and without the need to focus the electron beam. As a result, proximity effects and secondary electron effects are largely absent in SPM lithography.

Scanning probe microscopes were originally developed for analyzing surface topographies. Types of scanning probe microscopes include scanning tunneling microscopes (STM) and atomic force microscopes (AFM). An AFM may generally be operated in a contact (C-AFM) where the probe contacts the sample as well as in a non-contact (NC-AFM) mode where the probe does not contact the sample.

One form of scanning probe lithography operates by applying an electric potential between an SPM probe tip and a conductive layer of a sample. The electrical potential creates a strong electric field which can result in an electric field emission into the conductive layer of the sample. By positioning a layer of resist media between the conductive layer and the probe, the electric field and/or the electric field emission may be used to pattern the layer of resist media.

The electric field emission is essentially a beam of electrons which is projected through a layer of resist media into a conductive layer in the sample. When the electrons forming the electron beam decelerate within the layer of resist material, the electrons release kinetic energy into the resist layer along each electron's trajectory within the resist layer. The energy released by each electron can alter the resist media adjacent to the electron's trajectory, rendering the resist media exposed to the electron beam either more or less susceptible to removal during development, most commonly through some form of etching. Thus, the electron beam can serve to create a differential in the etch rates of resist media which have and have not been exposed to an electron beam and can be used to pattern the resist layer. Alternatively, the electric field may be used to render the resist media exposed to the electric field either more or less susceptible to removal during development.

Examples of resist media which have been use to perform electron beam lithography using an SPM include a self-assembling monolayer (C. R. K. Marrian, et al., *App. Phys. Lett.*, 64, 390 (1994)) and conventional resist media such as SAL-601 (R. K. Christie, et al., *J. Vac Sci. Tech.*, B10 2877 (1991)), P4BCMU (polydiacetylene with urethane substituents) (C. R. K. Marrian, et al., *J. Vac Sci. Tech.*, B7 2877 (1991)), and PMMA (poly-methyl-methacrylate (H. Zhang, et al., *J. Vac Sci. Tech.*, B7 1717 (1989)). These conventional resist media have high dielectric strengths. As a result, field emission only occurs through a very thin layer of these materials, generally on the order of 10 nm. Use of a 10 nm thick resist layer is not suitable for most microminiature pattern transfer processing, such as silicon wafer fabrication processing, because the resist layer is too thin to survive later etching steps.

Scanning probe lithography has also been used to oxidize hydrogen passivated silicon and hydrogen passivated polysilicon. J. W. Lyding, et al., *App. Phys. Lett.*, 64, 2010 (1994); E. S. Snow, et al., *App. Phys. Lett.*, 64, 1932 (1994); D. Wang, et al., , *App. Phys. Lett.*, 65, 1415 (1994); S. C. Minne, et al., *App. Phys. Lett.*, 66, 703 (1995). The use of scanning probe microscopes to oxidize substrates has generally been found to be unsuitable due to the slow speed and complexity of these processes.

Scanning probe lithography has also been performed using gold palladium films (G. C. Rosolen, et al., *App. Phys. Lett.*, 63, 2435 (1993)), calcium fluoride films (M. A. McCord, et al, *J. Vac. Sci.*, B5, 430 (1987)), porous Si films (M. Enachescu, et al., *App. Phys. Lett.*, 64, 2253 (1994)), a film of ferrocene molecules (F. Thibaudau, et al., *App. Phys. Lett.*, 64, 523 (1994)), and a film of cadmium (E. E. Ehrichs, et al., *App. Phys. Lett.*, 53, 2287 (1987)). However, the use of these films in silicon wafer processing is impractical due to the slow processing speed of these films and their negative effect on the electrical properties of MOS devices.

In general, resist media used for transferring microminiature patterns include a molecule based polymer, a crosslinking agent, and a solution. Depending on the composition of the polymer and crosslinker, the resist media may behave as either a positive or a negative type resist media. In the case of positive type resist media, strongly linked polymers are decomposed when exposed to an electron beam or light source, thereby becoming more susceptible to etching. In the case of negative type resist media, weakly linked polymers become more tightly composed when exposed to an electron beam or a light source, thereby becoming less susceptible to etching. Both positive and negative type resist media are needed for transferring microminiature patterns, particularly in silicon wafer processing.

Several criteria govern the utility of a resist medium, whether positive or negative type, for transferring microminiature patterns. The resist media should provide sufficient etch selectivity, (i.e., the difference in the etch rates of the resist media before and after exposure) to enable one to effectively distinguish between the exposed and unexposed resist media during development. The resist media should also form a continuous and uniform layer, even on a structured surface, so that only patterned areas of the media become etched. The resist media should also be resistant to cracking and should undergo a limited amount of shrinkage upon curing. In these regards, the resist media should be sufficiently thick to ensure the uniformity and flatness of the resist media layer. There also should not be any significant bumps or pinholes in the resist media layer. The resist media layer should also be sufficiently thick to enable the exposed and unexposed areas of the resist media to be effectively differentiated during development. It is important that the resist media layer be as thin as possible to minimize pattern spreading during exposure and development which causes loss of resolution.

It is also generally preferred that the resist media be suitable for dry exposure and development processes since wet exposure and development processes can cause particle contamination problems.

Most commercially available resist media must be processed according to highly specific procedures provided by the manufacturers. It is therefore also preferred that the resist media have a wide and flexible processing latitude with known behavior so that the resist media can be patterned under a variety of conditions.

A need currently exists for resist media which can be effectively used to transfer microminiature patterns. In particular, resist media are needed which have the physical properties described above.

SUMMARY OF THE INVENTION

A process is provided for transferring a microminiature pattern onto a substrate. The process includes taking a substrate including a layer of Spin-On Glass and exposing a portion of the Spin-On Glass layer to an electric field or an electron beam. Depending on the particular Spin-On Glass used, exposure of a portion of the Spin-On Glass layer to the electric field or electron beam causes the exposed portion to have either significantly enhanced or reduced susceptibility to etching as compared to the unexposed portion. This enables the exposed and unexposed portions to be differentiated by selectively removing the more etch susceptible portions of the Spin-On Glass layer during development.

As used herein, the term "develop" refers to the act of differentiating the exposed areas of the Spin-On Glass from the unexposed areas by selectively removing the more etch prone areas of the Spin-On Glass. The Spin-On Glass layer may be either a positive or a negative resist Spin-On Glass layer. When positive resist Spin-On Glass is employed, the exposed areas are relatively more prone to etching and are thus selectively removed. When negative resist Spin-On Glass is employed, the unexposed areas are relatively more prone to etching and are thus selectively removed.

Positive resist Spin-On Glass is preferably formed of a siloxane Spin-On Glass. The siloxane Spin-On Glass is preferably a Spin-On Glass substituted by an organic substituent where the organic substituent is either a $C_1$–$C_{20}$ alkane, $C_1$–$C_{20}$ alkene, $C_1$–$C_{20}$ alkyl phenyl, $C_1$–$C_{20}$ alkenyl phenyl, phenyl, $C_1$–$C_{20}$ phosphoalkane or a $C_1$–$C_{20}$ phosphoalkane. The mole ratio of silicon to the organic substituent in the siloxane Spin-On Glass should be sufficiently small that exposure of the Spin-On Glass resist media to an electric field or an electron beam increases the etch rate of the Spin-On Glass resist media relative to the unexposed Spin-On Glass resist media by a factor of at least 2, more preferably a factor of at least 10 and most preferably a factor of at least 20. It is preferred that the mole ratio of silicon to the organic substituent in the siloxane Spin-On Glass be less than about 100:1, more preferably less than about 20:1 and most preferably less than about 10:1. The positive resist Spin-On Glass layer preferably has a thickness between about 500 Å and 10,000 Å, more preferably between about 1,000 Å and 3,000 Å.

Negative resist Spin-On Glass is preferably formed of a Spin-On Glass in which at least some of the silicon atoms include either a phosphorus, sulfur, boron and selenium heteroatom substituent. The negative resist Spin-On Glass is preferably phosphosilicate, sulfosilicate, borosilicate and selenium silicate Spin-On Glass. The mole ratio of silicon to the heteroatom in the Spin-On Glass should be sufficiently small that exposure of the Spin-On Glass resist media to an electric field or an electron beam decreases the etch rate of the Spin-On Glass resist media relative to the unexposed Spin-On Glass resist media by a factor of at least 2, more preferably a factor of at least 10 and most preferably a factor of at least 20. It is preferred that the mole ratio of silicon to the heteroatom in the Spin-On Glass be less than about 100:1, more preferably less than about 20:1 and most preferably less than about 10:1 The negative resist Spin-On Glass layer preferably has a thickness between about 500 Å and 10,000 Å, more preferably between about 1,000 Å and 3,000 Å.

A process is also provided for transferring a microminiature pattern onto a substrate by taking a substrate having a conductive layer and a layer of Spin-On Glass positioned on top of the conductive layer, positioning an electron source in proximity with the Spin-On Glass layer such that the Spin-On Glass layer is positioned between the electron source and the conductive layer, and exposing a portion of the Spin-On Glass layer to an electric field or electron beam. According to this embodiment, the electron source is preferably positioned within about 1 µm of the Spin-On Glass layer. The conductive layer is preferably either aluminum, titanium or doped polysilicon.

In one embodiment of this process, the electron source is a scanning probe, such as an atomic force microscope, which may be operated in either a contact or a non-contact mode, or a scanning tunnelling microscope. According to one embodiment of the invention, the electron source includes a plurality of scanning probes.

Alternatively, the electron source may be a field emission projected onto a portion of the Spin-On Glass layer. The field emission may be generated, for example, by a scanning electron microscope.

BRIEF DESCRIPTION OF THE DRAWINGS

FIGS. 1A–C illustrate the exposure and development of a positive resist SOG layer. FIG. 1A illustrates a positive resist SOG layer.

FIGS. 2A–C illustrate the exposure and development of a negative resist SOG layer. FIG. 2A illustrates a negative resist SOG layer.

FIGS. 5A–E illustrate the lithography of a multilayer gate electrode structure in which a first SOG planarization layer, a conductive layer and a second SOG resist layer are used.

DETAILED DESCRIPTION OF THE PREFERRED EMBODIMENT

The present invention relates to a process for transferring microminiature patterns using Spin-On Glass (SOG) as a pattern transfer medium. According to the process, a layer of Spin-On Glass is provided over a substrate upon which a pattern is to be transferred. Areas of the Spin-On Glass media layer are exposed in a pattern to an electric field or an electron beam.

The electric field and/or electron beam is preferably formed by placing an electron source in close proximity (within about 1 µm) with the surface of the Spin-On Glass resist media. The electron source may be a scanning probe, for example, from an atomic force microscope operated in either a contact or a non-contact mode or a scanning tunnelling microscope. Optionally, the electron source can include a plurality of electron sources which can be simultaneously employed to expose the transfer media. For example, dual scanning probes may be operated in parallel. The electric field and/or electron beam may also be generated by a field emission source, for example from a scanning electron microscope.

Applications for using Spin-On Glass (SOG) polymer films to transfer microminiature patterns include, but are not limited to patterning semiconductor devices, patterning photomasks, optical lithography, creating microdots, media storage, printing, photography and the creation of holographic images.

Spin-On Glass polymer films are particularly useful as pattern transfer media in that these films form a continuous crack resistance film which undergoes a low degree of shrinkage upon curing. Spin-On Glass polymer films may also be used to perform high resolution patterning by dry exposure and development processes, thereby avoiding difficulties associated with wet processes.

Spin-On Glass, also commonly referred to as "SOG," refers to a silicon based polymer dielectric film formed by a spinning process through which a thin uniform polymer film is formed. Spin-On Glass films are known to be highly planar and crack resistant and traditionally have been used for planarization in integrated circuit fabrication and for protecting underlying features of the device.

One method for preparing Spin-On Glass polymer films include first thoroughly mixing the polymer in a the solvent. Once suspended in the solvent, the Spin-On Glass polymer is deposited onto the surface of a substrate, for example a silicon wafer. The Spin-On Glass polymer is then uniformly spread over the surface by the act of spinning the surface. The Spin-On Glass polymer dissolved in the solvent fills any indentations in the surface to form a uniform, continuous film. Most of the solvent used to dissolve the polymer is driven off by a first low temperature baking step which is generally conducted between about 100°–250° C. This first baking step is often followed by vacuum degassing. Other coatings of the Spin-On Glass material are applied, baked and vacuum degassed until the desired Spin-On Glass layer is formed. The final step in the preparation of the Spin-On Glass film is curing. Curing is a high temperature heating step, generally between about 400°–450° C., which causes the breakdown of the silicate or siloxane material to a silicon dioxide-like cross linked material. A cured Spin-On Glass process is described in U.S. Pat. No. 5,003,062 to Yen.

One embodiment of the present invention relates to the use of Spin-On Glass as a positive resist pattern transfer media. Positive resist Spin-On Glass, as the term is used herein, refers to Spin-On Glass which has a higher etch rate after exposure to an electric field and/or an electron beam. The exposure and development of a positive resist material is illustrated in FIGS. 1A–C.

Figure 1A:
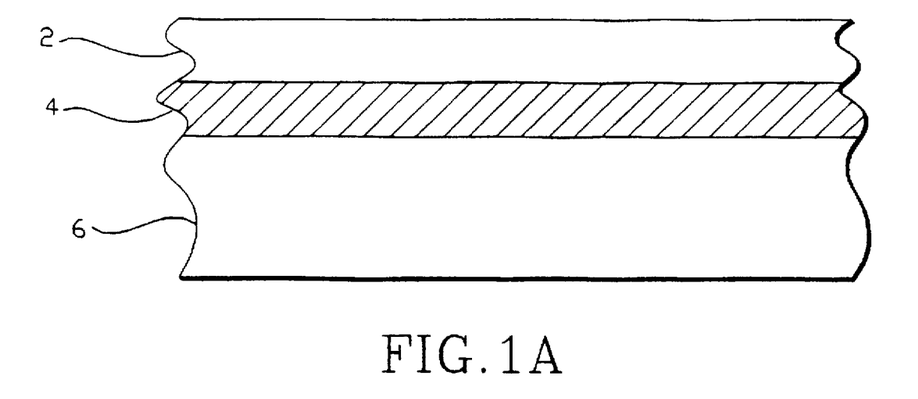

Illustrated in FIG. 1A is a positive resist Spin-On Glass film 2 positioned on top of a processing layer 4 which is positioned on top of a substrate 6, for example, a doped silicon wafer.

Figure 1B:
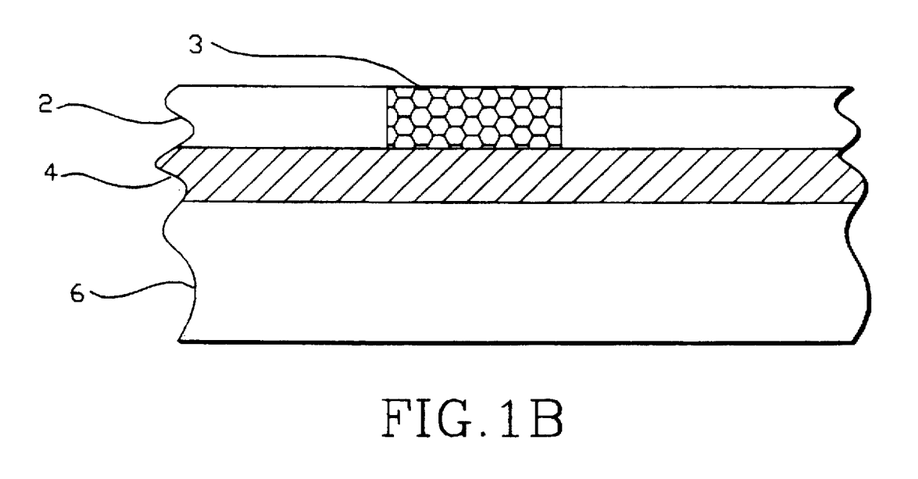
FIG. 1B illustrates a region of the positive resist SOG layer which has been exposed.
Figure 1C:
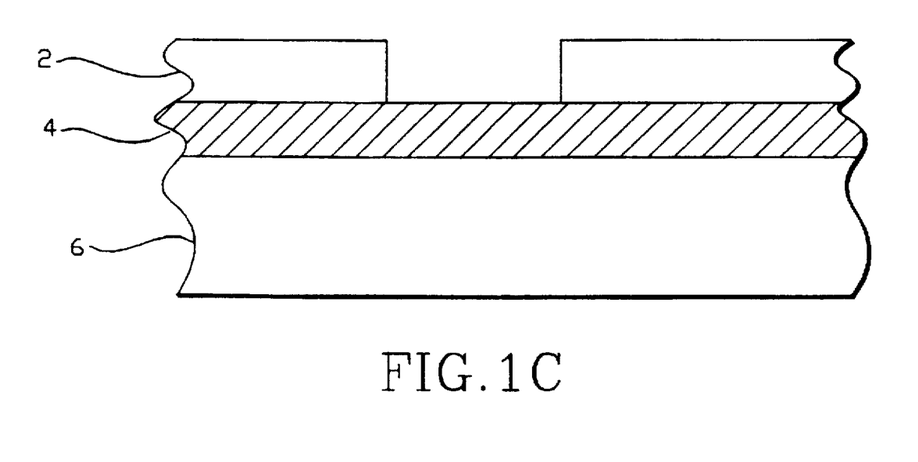
FIG. 1C illustrates the positive resist SOG layer after development.

FIG. 1B illustrates a region 3 of the positive resist Spin-On Glass film 2 after exposure to an electric field and/or an electron beam. As illustrated in FIG. 1B, exposure to an electric field and/or an electron beam renders region 3 more porous and thus more prone to etching. FIG. 1C illustrates the positive resist Spin-On Glass film 2 after development in which the region 3 which had been subjected to an electric field and/or an electron beam has been removed.

Spin-On Glass polymers which exhibit positive resist properties include siloxane Spin-On Glass. Siloxane Spin-On Glass refers to a class of $SiO_2$ Spin-On Glass polymers where at least a portion of the silicon atoms are bonded with an organic substituent. It is preferred that the organic substituent be either a $C_1$–$C_{20}$ alkane, $C_1$–$C_{20}$ alkene, $C_1$–$C_{20}$ alkyl phenyl, $C_1$–$C_{20}$ alkenyl phenyl, phenyl, $C_1$–$C_{20}$ phosphoalkane or $C_1$–$C_{20}$ phosphoalkane.

It is currently unclear whether a strong electric field or a beam of electrons are responsible for altering the etch rate of the Spin-On Glass. The precise mechanism by which the etch rate is increased is also unknown. However, it has been found that the etch rate of siloxane Spin-On Glass is inversely proportional to the organic content in the siloxane Spin-On Glass. The positive resist properties of the siloxane Spin-On Glass polymer are believed to be due to the breakage of the silicon-carbon bond of the siloxane when the siloxane polymer is exposed to either a strong electric field or an electron beam, thereby decreasing the organic content of the siloxane. By decreasing the organic content in the siloxane, the etch rate of the siloxane is increased, most probably by making the Spin-On Glass layer more porous which makes the film more prone to etching.

The organic content of the siloxane Spin-On Glass should be sufficiently large that exposure of the Spin-On Glass resist media to an electric field and/or an electron beam increases the etch rate of the Spin-On Glass resist media relative to the unexposed Spin-On Glass resist media by a factor of at least 2, more preferably a factor of at least 10 and most preferably a factor of at least 20. It has been found that the dielectric constant and the shrinkage of the siloxane Spin-On Glass upon curing decreases as the organic content in the siloxane Spin-On Glass increases. It has also been found that the suitability of the siloxane Spin-On Glass for use in planarization is also dependent on the organic content in the siloxane Spin-On Glass. In this regard, it is preferred that the mole ratio of silicon to the organic substituent in the siloxane Spin-On Glass be less than 100:1, more preferably less than 20:1 and most preferably less than 10:1.

The positive resist Spin-On Glass media layer preferably has a thickness between about 500 Å and 10,000 Å and more preferably between about 1,000 Å and 3,000 Å. As the thickness of the positive resist Spin-On Glass increases, larger and larger electric potentials are required to create the electric field and/or the electron beam. As the thickness of the positive resist media layer increases and the electric potential that is required increases, the minimum pattern sizes that can be achieved also increases. It is therefore preferred that the positive resist media layer be as thin as possible. However, the minimum thickness of the resist media that can be used is dependent on the uniformity of the resist media and the differential etch rates that can be achieved between the exposed and unexposed resist media. This ultimately limits the minimum media thickness that can be used.

Figure 2A:
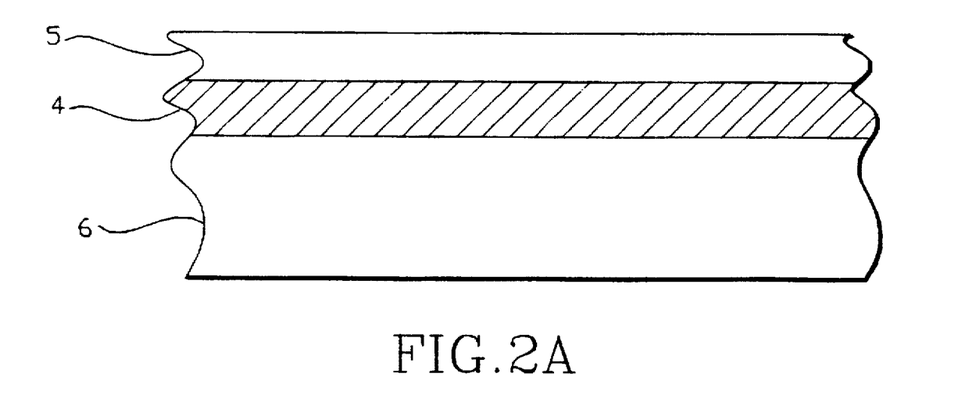
Figure 2B:
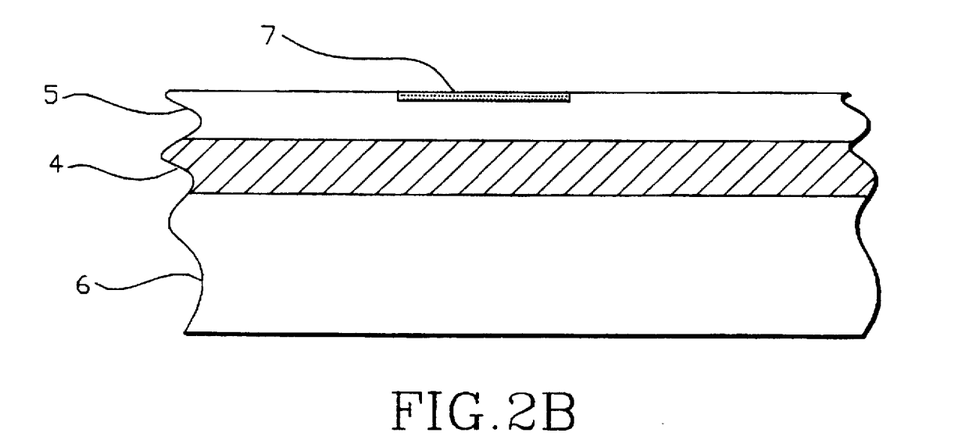
FIG. 2B illustrates a region of the negative resist SOG layer which has been exposed to an electron beam.
Figure 2C:
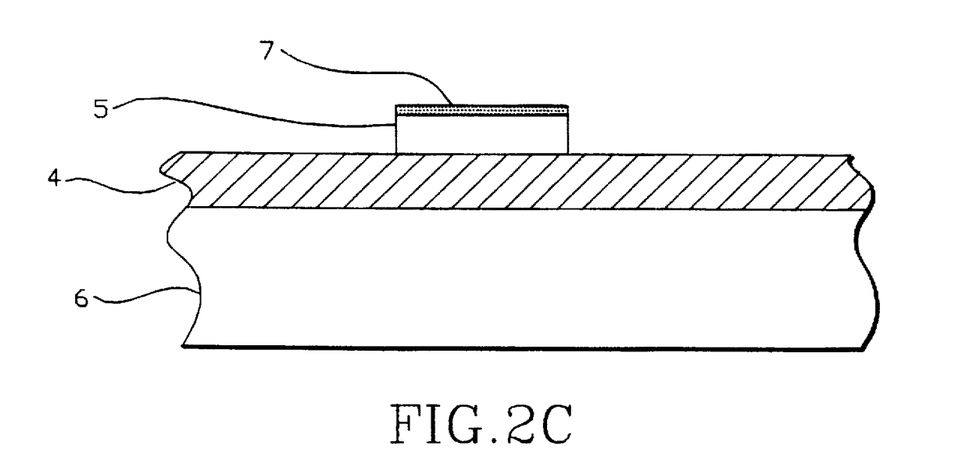
FIG. 2C illustrates the negative resist SOG layer after development.

An alternate embodiment of the present invention relates to negative resist Spin-On Glass polymer films. Negative resist Spin-On Glass polymers, as the term is used herein, refers to Spin-On Glass polymers which have a slower etch rate after exposure to an electric field or an electron beam. The exposure and development of a negative resist layer is illustrated in FIGS. 2A–C. Illustrated in FIG. 2A is a negative resist Spin-On Glass film 5 positioned on top of a processing layer 4 which is positioned on top of a substrate 6, for example a doped silicon wafer. FIG. 2B illustrates a region 7 of the negative resist Spin-On Glass film 5 after exposure to an electric field and/or an electron beam. As illustrated in FIG. 2B, exposure to the electric field and/or the electron beam renders region 7 denser and hence less prone to etching. FIG. 2C illustrates the negative resist Spin-On Glass film 5 after development in which the unexposed negative resist Spin-On Glass film has been removed leaving only region 7 which had been exposed to the electric field and/or the electron beam.

Spin-On Glass polymers which exhibit negative resist properties include phosphor, sulfur, boron and selenium doped Spin-On Glass polymers (phosphosilicate, sulfosilicate, borosilicate, selenium silicate).

The phosphor, sulfur, boron and selenium content in the Spin-On Glass should be sufficiently large that exposure of the Spin-On Glass resist media to an electric field and/or an electron beam decreases the etch rate of the Spin-On Glass resist media relative to the unexposed Spin-On Glass resist media by a factor of at least 2, more preferably a factor of at least 10 and most preferably a factor of at least 20. The doped Spin-On Glass polymer negative resist film is preferably a phosphosilicate Spin-On Glass polymer.

The negative resist properties of the phosphor, sulfur, boron or selenium doped Spin-On Glass polymer is believed to be due to the oxidation of free phosphor, sulfur, boron or selenium ions in the film to form oxides which are denser and less prone to etching. In this regard, it is preferred that the mole ratio of silicon to the phosphor, sulfur, boron or selenium in the doped Spin-On Glass be less than 100:1, more preferably less than 20:1 and most preferably less than 10:1.

One advantage provided by using Spin-On Glass films as positive and negative resist layers is its ability to be removed by dry etching processes, such as reactive ion etching (RIE). Dry development processes avoid problems associated with particle contamination that is created by wet development processes.

The electric field and/or electron beam used may be formed by creating an electric potential between an electron source and a conductive layer, the resist media being positioned between the electron source and the conductive layer. According to this embodiment, the electron source is preferably placing in close proximity (within about 1 μm) with the surface of the Spin-On Glass resist media. According to this embodiment, the electron source is preferably scanable across the surface of the resist media. Examples of suitable electron sources according to this embodiment include probes from scanning probe microscopes, such as an atomic force microscope operated in either a contact or a non-contact mode and a scanning tunnelling microscope.

The electron beam may also be generated by device which produces a field emission. One example of a device which produces a suitable field emission is a scanning electron microscope.

It should be understood that the electron source may be moveable relative to the Spin-On Glass media. Alternatively the Spin-On Glass media may be moveable relative to the electron source, for example by a scanable sample holder. By making the Spin-On Glass media and electron source movable relative to each other, detailed exposure patterns may be created in the Spin-On Glass media.

Figure 3:
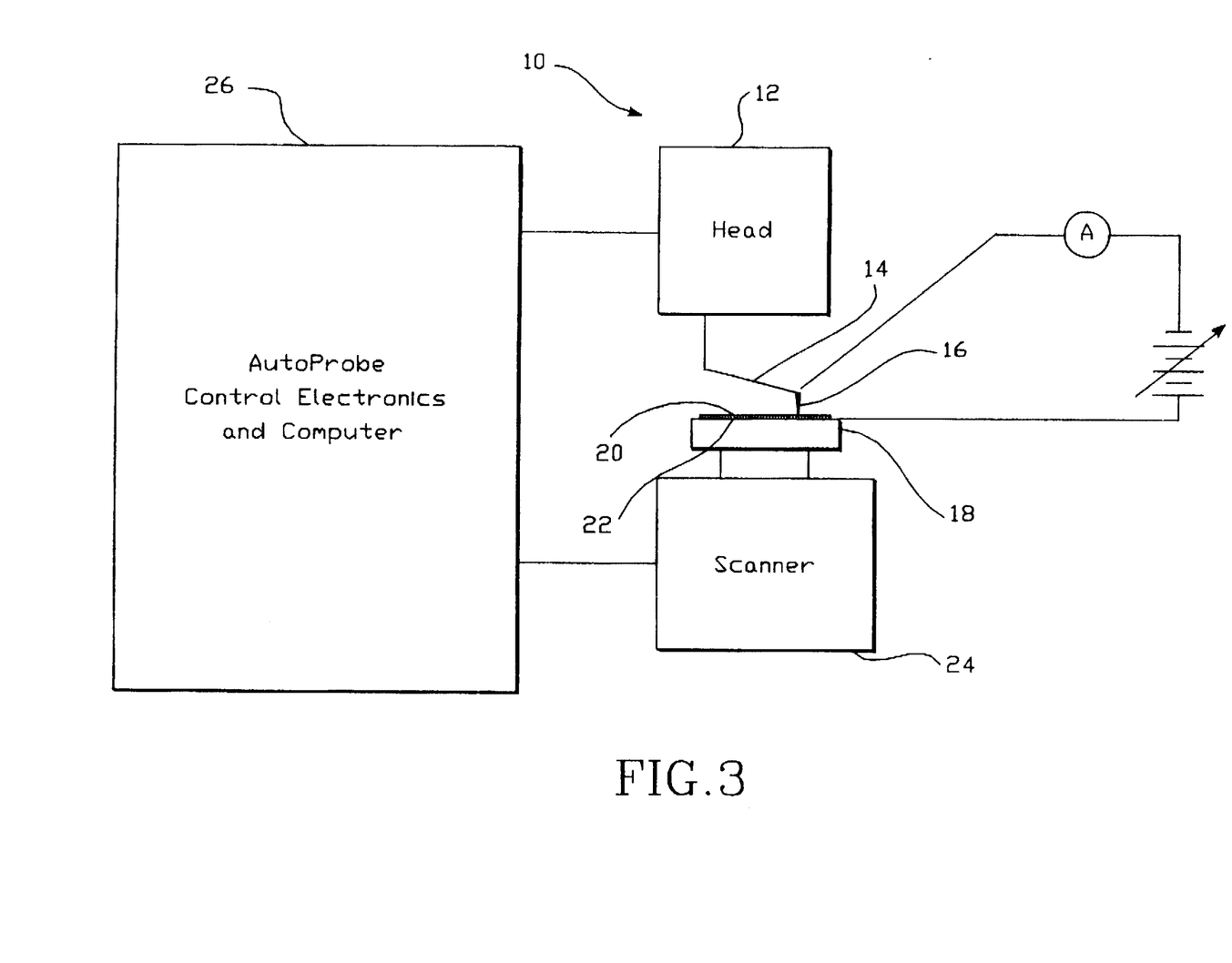
FIG. 3 is a schematic diagram of a scanning probe microscope system of the present invention for use in transferring microminiature patterns according to the present invention.

FIG. 3 is a schematic diagram of a scanning probe microscope system which may be used as an electron source. As illustrated in FIG. 3, the scanning probe microscope 10 includes a probe head 12 which includes a probe 14 having a tip 16. The scanning probe microscope 10 also includes a sample holder 18 on which a sample 20 is placed. The sample 20 is electrically connected to the sample holder 18 with, for example, silver paste 22. The position of the sample holder is controlled by a scanner 24 which is electrically isolated from the sample holder 18. A bias voltage is applied between the sample 20 and the tip 16 of the SPM probe 14. The electrical potential applied to the sample is controlled by changing the DC voltage that is applied from a control unit 26 which also controls the scanner. The electron beam current between the tip and the sample may be measured using a current-to-voltage converting OP amplifier. The converting ratio was set at $10^8$ V/A. Experiments verified that the field emission currents generated by this setup were normal in that they closely follow Fowler-Nordheim behavior ($I/V^2$ versus $1/V$).

The electric field and/or electron beam introduced by the electron source spreads radially through the Spin-On Glass resist media. Correspondingly, the electric field and/or electron beam intensity is strongest near the electron source. By reducing the strength of the electric field and/or electron beam intensity, or by reducing the duration of exposure, it is possible to expose only a narrow and shallow region of the Spin-On Glass media adjacent the electron source. Accordingly, when the resist media is a positive resist Spin-On Glass, only a narrow and shallow region of the Spin-On Glass media will become less dense and hence more susceptible to etching. When the resist media is a negative resist Spin-On Glass material, only a narrow and shallow region of the Spin-On Glass media will become more dense and hence less susceptible to etching. Alternatively, by increasing the strength of the electric field and/or electron beam intensity, or by increasing the duration of exposure, it is possible to expose broader and deeper regions of the Spin-On Glass media adjacent the electron source. Thus, depending on the intensity of the electric field and/or electron beam and the duration of the exposure, different widths and thicknesses of the resist media can be exposed.

A variety of methods may be used to develop the resist layer so that the dimensions of the exposed resist areas are maintained. For example, a highly anisotropic dry etch, such as reactive ion etching (RIE) can be used where the Spin-On Glass layer is developed in a predominantly vertical direction such that the developed pattern has substantially the same lateral dimensions as the exposed resist media. Alternatively, the exposed Spin-On Glass film layer may be used as a template for a second flood exposure using highly collimated radiation, such as electron beams, optical light or x-rays. This second exposure step is used to expose the Spin-On Glass film throughout its thickness such that the lateral dimension of the exposed layer is comparable in size to the surface pattern dimension. Differential exposure of the Spin-On Glass media by the flood radiation may be enhanced by treatment of the Spin-On Glass surface with materials which increase the contrast between the exposed and unexposed regions.

The following examples illustrate the process of the present invention for transferring microminiature patterns using Spin-On Glass (SOG) as the pattern transfer media. Further objectives and advantages of the present invention other than those set forth above will become apparent from the examples which are not intended to limit the scope of the present invention.

EXAMPLE 1

Figure 4:
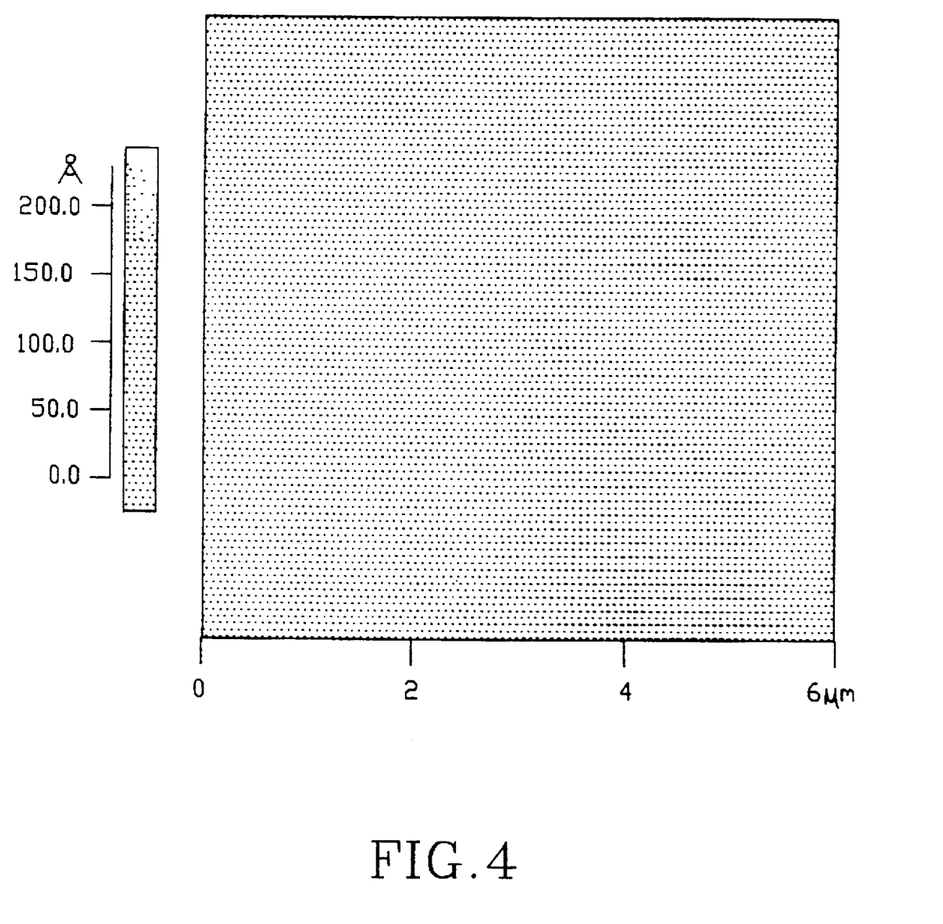
FIG. 4 provides an AFM image of a layer of positive SOG resist media after exposure and development.

FIG. 4 provides an image of a positive resist Spin-On Glass after exposure and development. The positive resist Spin-On Glass used in this experiment was methylsiloxane Spin-On Glass (R=CH$_3$) (Allied Signal ACCUGLASS$^R$, Product No. 111) which has a silicon to methyl mole ratio of 100:11. The dark lines 28 illustrated in FIG. 4 represent regions which were exposed to a beam of electrons.

A 97 nm thick film of the methylsiloxane Spin-On Glass polymer film was made on a silicon wafer by spinning the wafer at 5,000 rpm. The film was then cured at 280° C. for ten minutes. The voltage applied between the SPM tip and the sample was 60 V. The resulting field emission current was measured at 12 nA. The lines 28 shown were created by scanning the SPM tip over the sample in 64×64 pixel imaging mode across an 80×80 μm area at 6 Hz. After exposure, the sample was etched using a 1:100 Buffered Oxide Etcher (BOE) solution. Only a dilute BOE solution was employed due to the highly porous nature of the exposed resist film. The development time of the exposed region was measured to be 5 seconds, the etching rate being calculated to be nearly 20 nm/sec. The line width and the space between the lines achieved are about 0.15 μm and 1.1 μm respectively. The pitch (line width+line space) was measured to be 1.25 which is as expected given that 64 raster scan lines were formed in a 80×80 μm area.

EXAMPLE 2

Figure 5A:
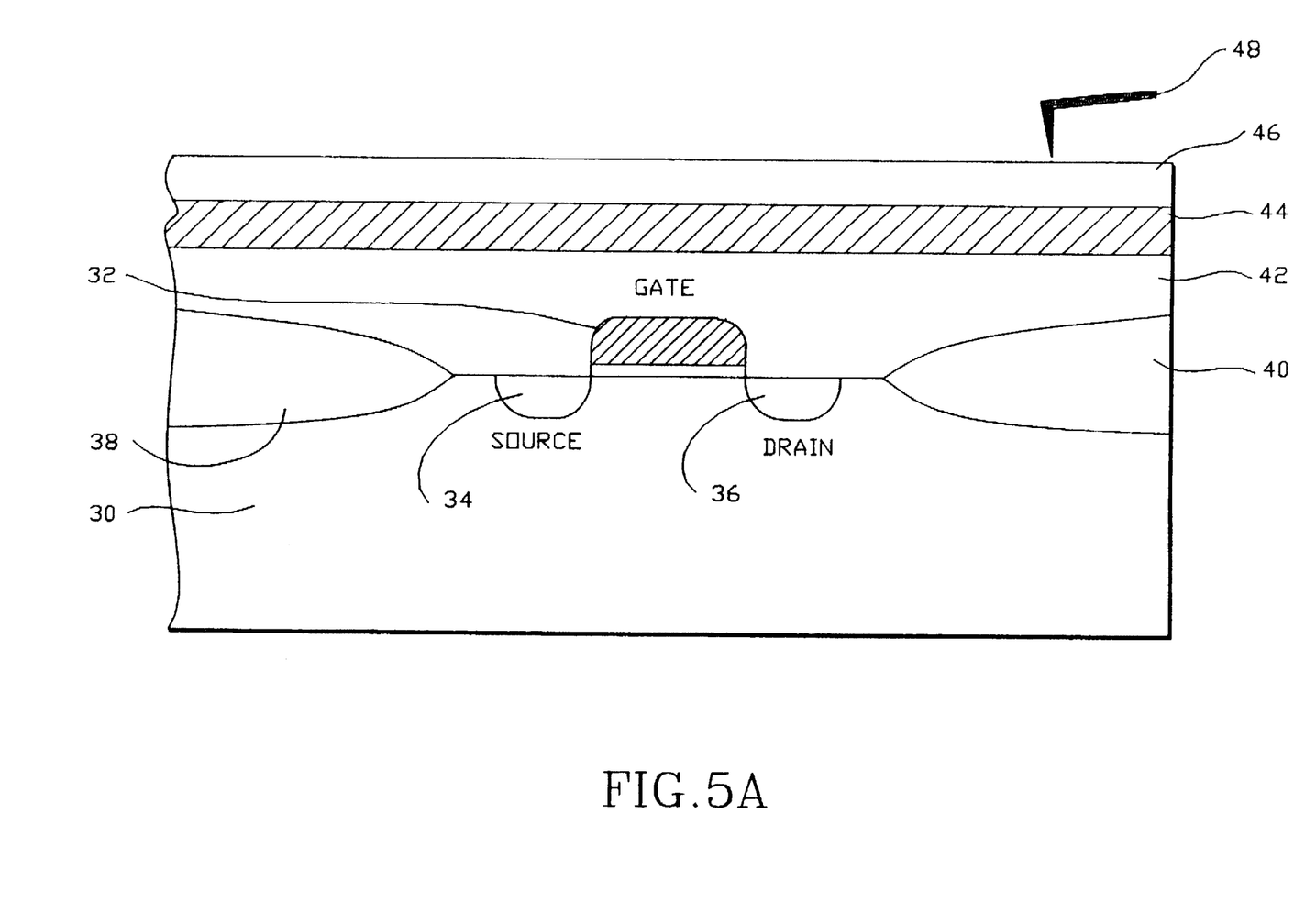
FIG. 5A illustrates a cross-sectional diagram of the multilayer structure.
Figure 5B:
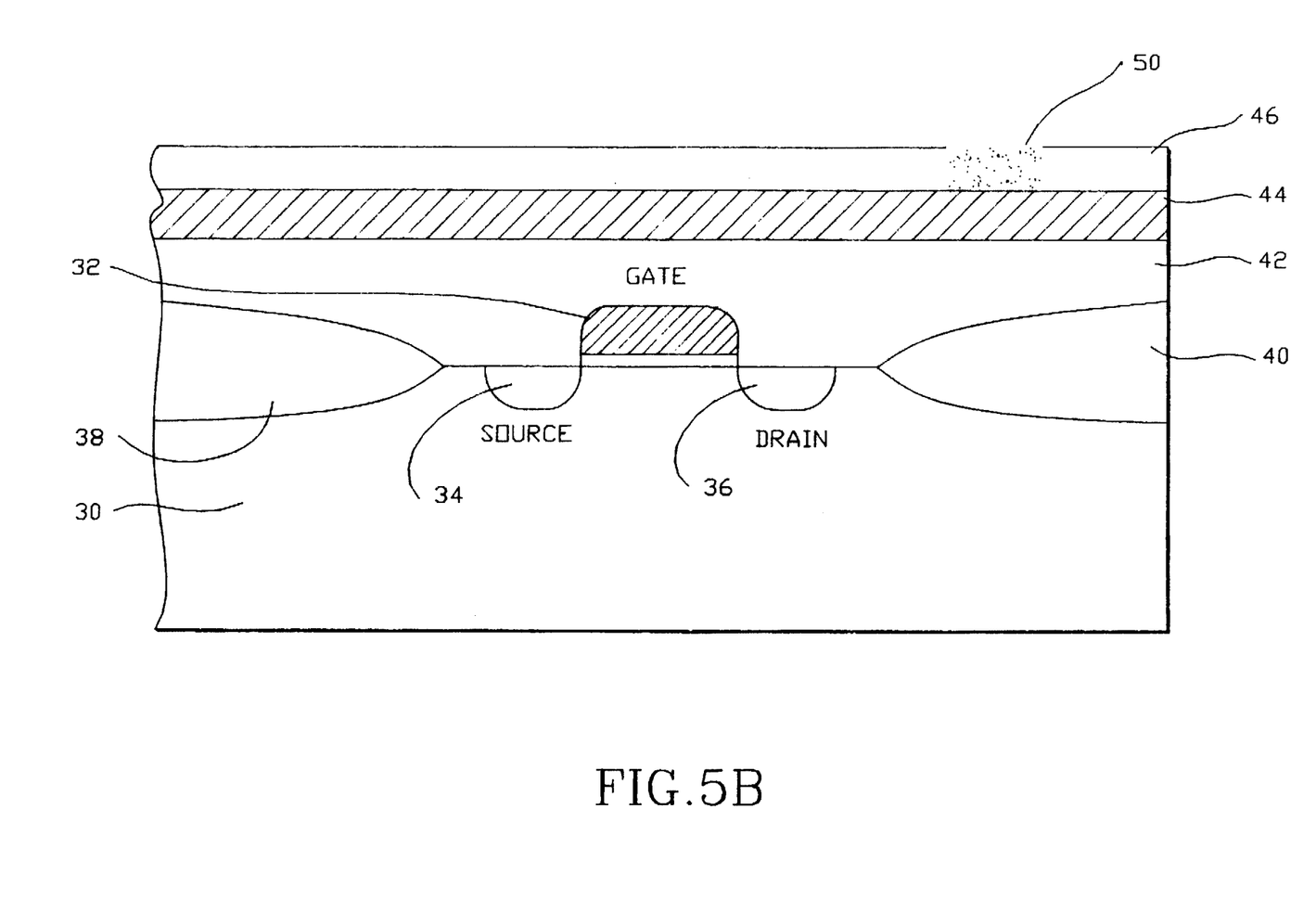
FIG. 5B illustrates the multilayer structure illustrated in FIG. 5A after exposure.
Figure 5C:
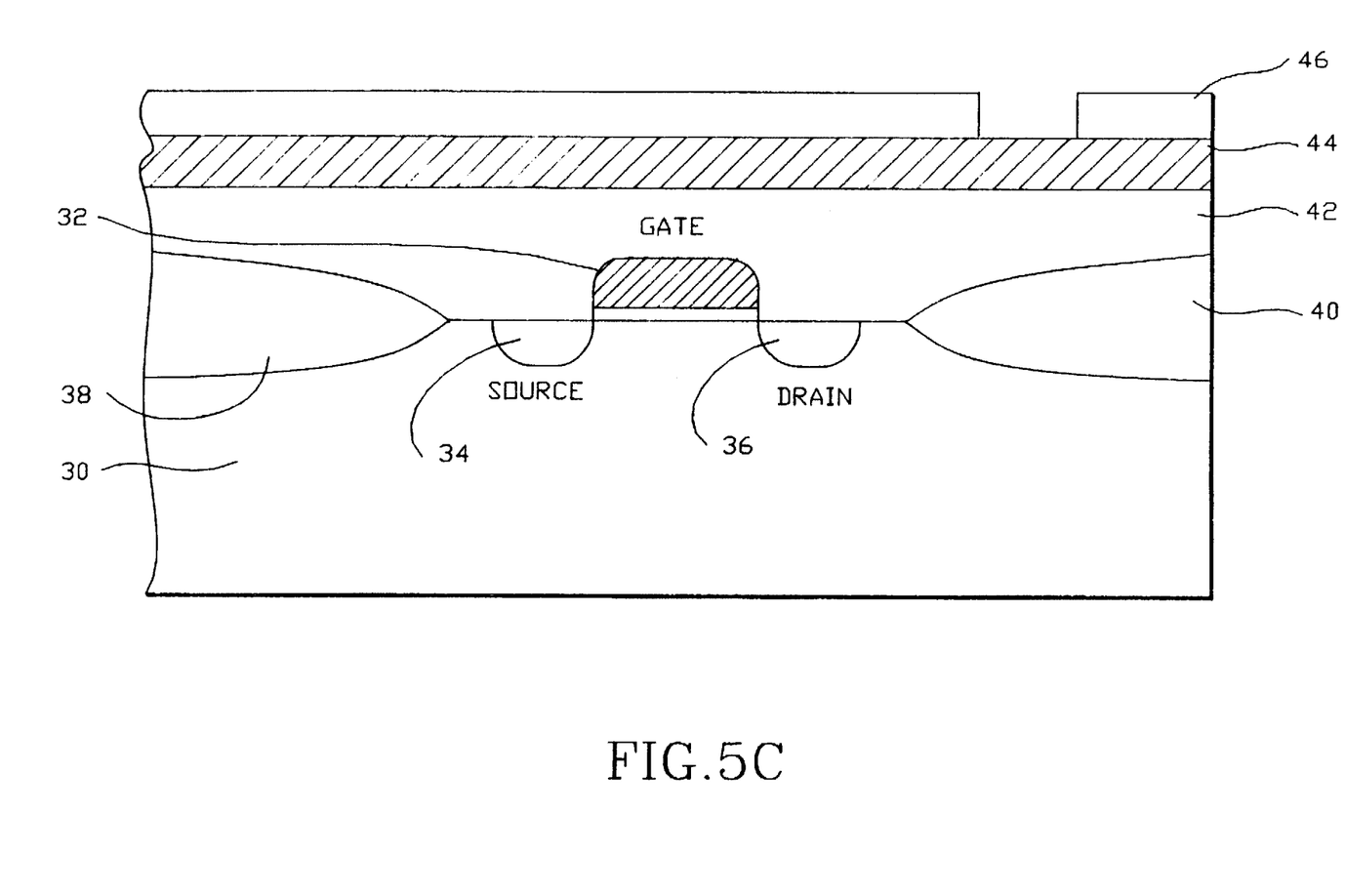
FIG. 5C illustrates the multilayer structure illustrated in FIG. 5B after development of the second SOG resist layer.

FIGS. 5A–C illustrate the lithography of a multilayer structure including a gate electrode in which a first SOG planarization layer, a conductive layer and a second SOG resist layer are used. As illustrated in FIGS. 5A–E, the Spin-On Glass polymers of the present invention may be used to planarize the surface of a device as well as to transfer a microminiature pattern.

FIG. 5A illustrates a cross-sectional diagram of the multilayer structure. The multilayer gate electrode illustrated in FIG. 5A is presented as an exemplary structure upon which microminiature patterns may be transferred and in no way is intended to limit the types of structures upon which microminiature patterns may be transferred. Rather, the multilayer gate electrode illustrated in FIG. 5A is intended as an example of surface morphology which can be effectively planarized and patterned using Spin-On Glass.

As illustrated in FIG. 5A, the multilayer gate electrode includes a silicon substrate layer 30, a gate electrode 32, n+source 34 and drain 36 diffusion regions and field oxide regions 38 and 40. A first layer of Spin-On Glass 42 is deposited over the gate electrode poly 32. This first layer of Spin-On Glass 42 serves as a planarization layer to even out surfaces irregularities. A conductive layer 44 is deposited over the first Spin-On Glass layer 42. The conductive layer 44 is generally a metal layer, such as titanium, aluminum or a highly doped polysilicon layer. A second Spin-On Glass layer 46 is deposited on the conductive layer 44. According to this embodiment, the conductive layer 44 serves as an electrode to enable the creation of an electric field or an electron beam between the conductive layer 44 and the electron source 48 positioned above the second Spin-On Glass layer 46.

FIG. 5B illustrates the multilayer structure illustrated in FIG. 5A after exposure of an area of the second Spin-On Glass layer 46. As illustrated in FIG. 5B, an area 50 of the second Spin-On Glass layer 46 has been exposed to either an electric field or an electron beam suitable for modifying the etch rate of the second Spin-On Glass layer 46.

FIG. 5C illustrates the multilayer structure illustrated in FIG. 5B after development of the second SOG resist layer. Development is preferably formed by a dry etch for anistropy, preferably by reactive ion etching. As illustrated in FIG. 5C, the exposed area 50 of the second Spin-On Glass layer 46 is removed.

Figure 5D:
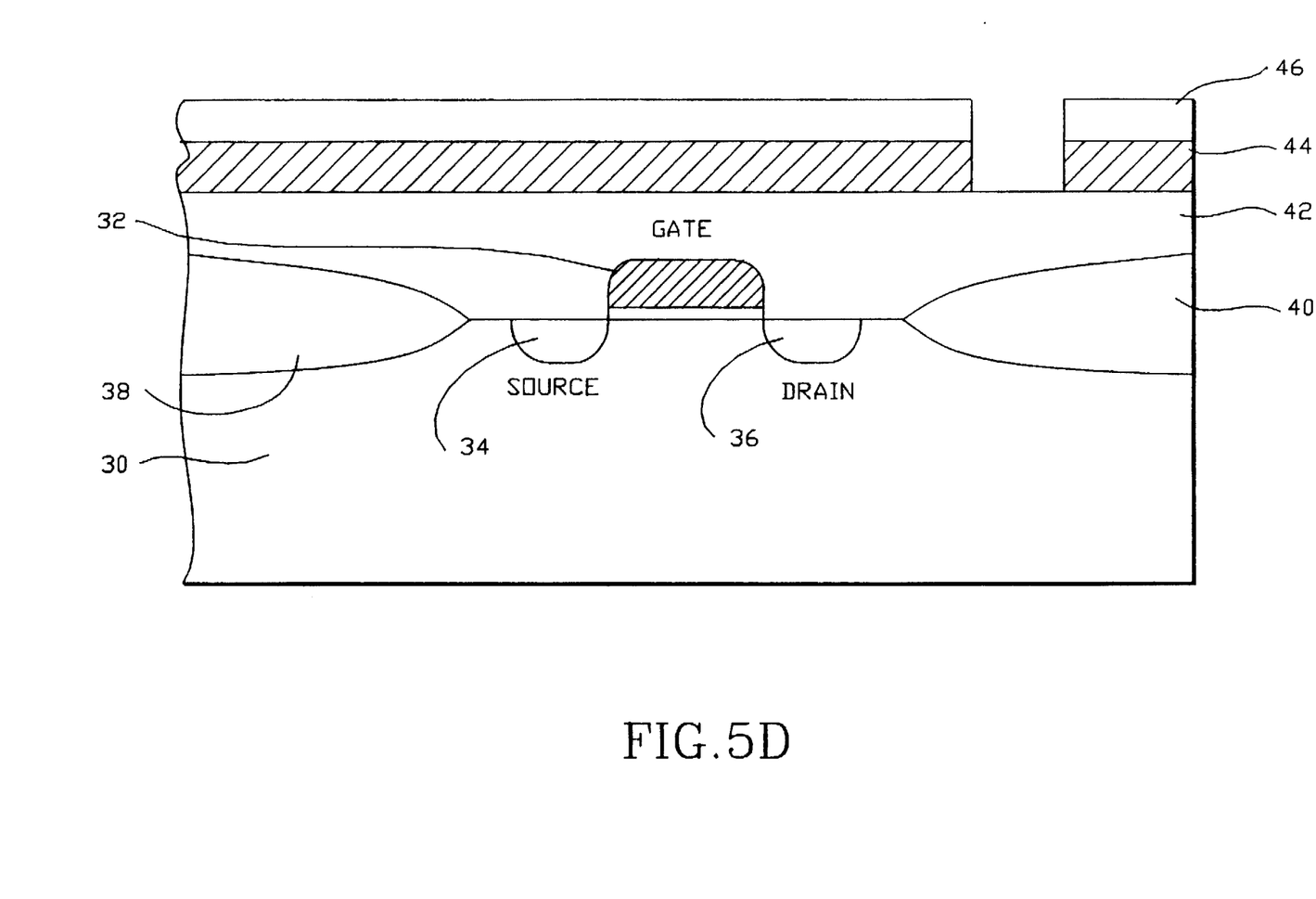
FIG. 5D illustrates the multilayer structure illustrated in FIG. 5C after development of the conductive layer.

FIG. 5D illustrates the multilayer structure illustrated in FIG. 5C after development of the conductive layer. As illustrated in FIG. 5D, an area of the conductive layer 44 positioned beneath the exposed area 50 of the second Spin-On Glass layer 46 is removed.

Figure 5E:
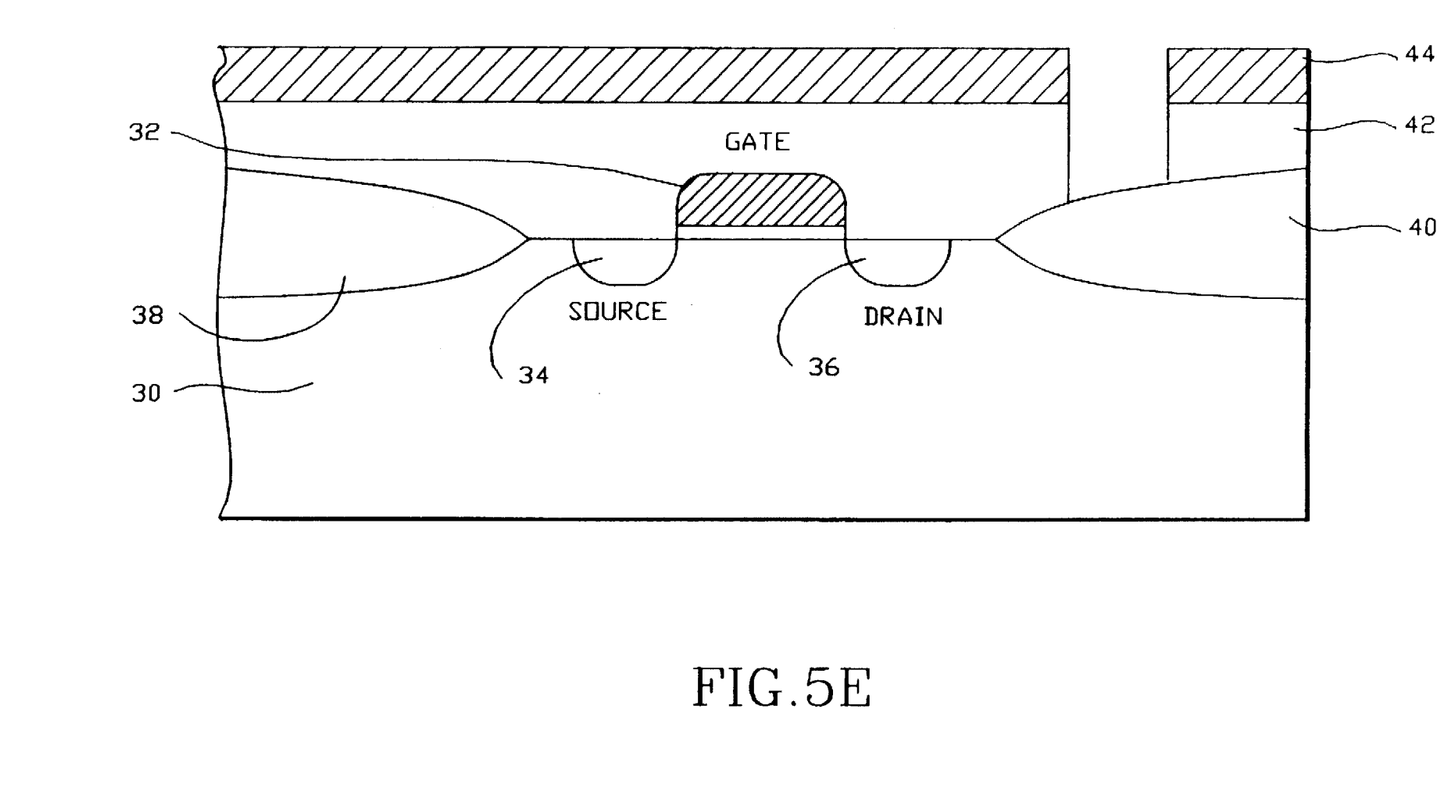
FIG. 5E illustrates the multilayer structure illustrated in FIG. 5D after development of the first SOG planarization layer.

FIG. 5E illustrates the multilayer structure illustrated in FIG. 5D after development of the first Spin-On Glass layer 42. As illustrated in FIG. 5E, an area of the first Spin-On Glass layer 42 positioned beneath the removed area of the conductive layer 44 is removed. The remainder of the second Spin-On Glass layer 46 is also removed during this development step.

While the present invention is disclosed by reference to the preferred embodiments and examples detailed above, it is to be understood that these examples are intended in an illustrative rather than limiting sense, as it is contemplated that modifications will readily occur to those skilled in the art, which modifications will be within the spirit of the invention and the scope of the appended claims.

What is claimed is:

1. A process for altering a susceptibility of a portion of a Spin-On Glass layer to etching comprising:
    taking a substrate including a layer of positive resist Spin-On Glass; and
    exposing a portion of the positive resist Spin-On Glass layer to an electric field or electron beam to increase the susceptibility of the exposed portion of the positive resist Spin-On Glass layer to etching.

2. The process according to claim 1 wherein the positive resist Spin-On Glass layer is a siloxane Spin-On Glass layer.

3. The process according to claim 2 wherein the siloxane Spin-On Glass is a Spin-On Glass substituted by an organic substituent selected from the group consisting of a $C_1$–$C_{20}$ alkane, $C_1$–$C_{20}$ alkene, $C_1$–$C_{20}$ alkyl phenyl, $C_1$–$C_{20}$ alkenyl phenyl, phenyl, $C_1$–$C_{20}$ phosphoalkane and $C_1$–$C_{20}$ phosphoalkane.

4. The process according to claim 3 wherein the mole ratio of silicon to the organic substituent is sufficiently small that exposure of the positive resist Spin-On Glass resist media to an electric field or an electron beam increases the etch rate of the exposed Spin-On Glass resist media relative to the unexposed Spin-On Glass resist media by a factor of at least 2.

5. The process according to claim 3 wherein the mole ratio of silicon to the organic substituent is sufficiently small that exposure of the positive resist Spin-On Glass resist media to an electric field or an electron beam increases the etch rate of the exposed Spin-On Glass resist media relative to the unexposed Spin-On Glass resist media by a factor of at least 10.

6. The process according to claim 3 wherein the mole ratio of silicon to the organic substituent is sufficiently small that exposure of the positive resist Spin-On Glass resist media to an electric field or an electron beam increases the etch rate of the exposed Spin-On Glass resist media relative to the unexposed Spin-On Glass resist media by a factor of at least 20.

7. The process according to claim 3 wherein the mole ratio of silicon to the organic substituent in the positive resist Spin-On Glass resist media is less than about 100:1.

8. The process according to claim 3 wherein the mole ratio of silicon to the organic substituent in the positive resist Spin-On Glass resist media is less than about 20:1.

9. The process according to claim 3 wherein the mole ratio of silicon to the organic substituent in the positive resist Spin-On Glass resist media is less than about 10:1.

10. The process according to claim 2 wherein the positive resist Spin-On Glass layer has a thickness between about 1,000 Å and 3,000 Å.

11. The process according to claim 1 further including the step of removing the portion of the positive resist Spin-On Glass layer exposed to the electric field or electron beam.

12. A process for altering a susceptibility of a portion of a Spin-On Glass layer to etching comprising:
    taking a substrate including a layer of negative resist Spin-On Glass which includes silicon bonded to a heteroatom selected from the group consisting of phosphorus, sulfur, boron and selenium; and
    exposing a portion of the negative resist Spin-On Glass layer to an electric field or electron beam to decrease the susceptibility of the exposed portion of the negative resist Spin-On Glass to etching.

13. The process according to claim 12 wherein the negative resist Spin-On Glass is selected from the group consisting of phosphosilicate, sulfosilicate, borosilicate and selenium silicate Spin-On Glass.

14. The process according to claim 12 wherein the mole ratio of silicon to the heteroatom in the negative resist Spin-On Glass resist media is sufficiently small that exposure of the negative resist Spin-On Glass media to an electric field or an electron beam decreases the etch rate of the exposed Spin-On Glass resist media relative to the unexposed Spin-On Glass resist media by a factor of at least 2.

15. The process according to claim 12 wherein the mole ratio of silicon to the heteroatom in the negative resist Spin-On Glass resist media is sufficiently small that exposure of the negative resist Spin-On Glass media to an electric field or an electron beam decreases the etch rate of the exposed Spin-On Glass resist media relative to the unexposed Spin-On Glass resist media by a factor of at least 10.

16. The process according to claim 12 wherein the mole ratio of silicon to the heteroatom in the negative resist Spin-On Glass resist media is sufficiently small that exposure of the negative resist Spin-On Glass media to an electric field or an electron beam decreases the etch rate of the exposed Spin-On Glass resist media relative to the unexposed Spin-On Glass resist media by a factor of at least 20.

17. The process according to claim 12 wherein the mole ratio of silicon to the heteroatom in the negative resist Spin-On Glass resist media is less than about 100:1.

18. The process according to claim 12 wherein the mole ratio of silicon to the heteroatom in the negative resist Spin-On Glass resist media is less than about 20:1.

19. The process according to claim 12 wherein the mole ratio of silicon to the heteroatom in the negative resist Spin-On Glass resist media is less than about 10:1.

20. The process according to claim 12 wherein the negative resist Spin-On Glass layer has a thickness between about 1,000 Å and 3,000 Å.

21. The process according to claim 12 further including the step of selectively removing the negative resist Spin-On Glass layer except for the portion of the negative resist Spin-On Glass layer exposed to the electric field or electron beam.

22. A process for altering a susceptibility of a portion of a Spin-On Glass layer to etching comprising:
    taking a substrate including a conductive layer and a layer of positive resist Spin-On Glass positioned on top of the conductive layer;
    positioning an electric field or electron beam source in proximity with the positive resist Spin-On Glass layer such that the positive resist Spin-On Glass layer is positioned between the electric field or electron beam source and the conductive layer; and
    exposing a portion of the positive resist Spin-On Glass layer to an electric field or electron beam to alter the susceptibility of the portion of the positive resist Spin-On Glass layer to etching.

23. The process according to claim 22 wherein the electric field or electron beam source is positioned within about 1 μm of the Spin-On Glass layer.

24. The process according to claim 22 wherein the conductive layer is selected from the group consisting of: aluminum, titanium and doped polysilicon.

25. The process according to claim 22 wherein the electric field or electron beam source is a scanning probe.

26. The process according to claim 25 wherein the scanning probe is an atomic force microscope or a scanning tunnelling microscope.

27. The process according to claim 25 wherein the scanning probe has a width and the Spin-On Glass layer has a thickness that is equal to or less than the width of the scanning probe.

28. The process according to claim 22 wherein the electric field or electron beam source includes a plurality of scanning probes.

29. The process according to claim 22 wherein exposing the positive resist Spin-On Glass layer renders the exposed portion of the positive resist Spin-On Glass layer more susceptible to etching, the process further including the step of selectively removing the exposed portion of the positive resist Spin-On Glass layer.

30. A process for altering a susceptibility of a portion of a Spin-On Glass layer to etching comprising:

forming a first Spin-On Glass layer on top of the substrate;

forming a conductive layer on top of the first Spin-On Glass layer;

forming a second Spin-On Glass layer on top of the conductive layer; and exposing a portion of the second Spin-On Glass layer to an electric field or an electron beam to alter the susceptibility of the portion of the second Spin-On Glass layer to etching.

31. The process according to claim 30 wherein the second Spin-On Glass layer is a positive resist Spin-On Glass layer, the step of exposing the second Spin-On Glass layer rendering the exposed portion of the second Spin-On Glass layer more susceptible to etching.

32. The process according to claim 31 further including the step of selectively removing the exposed portion of the second Spin-On Glass layer.

33. The process according to claim 32 further including the step of removing a portion of the conductive layer and a portion of the first Spin-On Glass layer positioned beneath the removed portion of the second Spin-On Glass layer.

34. The process according to claim 30 wherein the second Spin-On Glass layer is a negative resist Spin-On Glass layer, the step of exposing the second Spin-On Glass layer rendering the exposed portion of the second Spin-On Glass layer less susceptible to etching.

35. The process according to claim 34 further including the step of selectively removing the unexposed portion of the second Spin-On Glass layer.

36. The process according to claim 35 further including the step of removing a portion of the conductive layer and a portion of the first Spin-On Glass layer positioned beneath the removed portion of the second Spin-On Glass layer.

37. The process according to claim 30 wherein the conductive layer is selected from the group consisting of: aluminum, titanium and doped polysilicon.

38. The process according to claim 30 wherein the step of exposing the portion of the second Spin-On Glass layer includes positioning an electron source in proximity with the Spin-On Glass layer such that the Spin-On Glass layer is positioned between the electron source and the conductive layer; and generating the electric field or the electron beam between the electron source and the conductive layer.

39. A process for altering a susceptibility of a portion of a Spin-On Glass layer to etching comprising:

taking a substrate including a conductive layer and a layer of negative resist Spin-On Glass which includes silicon bonded to a heteroatom selected from the group consisting of phosphorus sulfur, boron and selenium positioned on top of the conductive layer;

positioning an electric field or electron beam source in proximity with the negative resist Spin-On Glass layer such that the negative resist Spin-On Glass layer is positioned between the electric field or electron beam source and the conductive layer; and exposing a portion of the negative resist Spin-On Glass layer to an electric field or electron beam to alter the susceptibility of the portion of the negative resist Spin-On Glass layer to etching.

40. The process according to claim 39 wherein the electric field or electron beam source is a scanning probe.

41. The process according to claim 40 wherein the scanning probe is an atomic force microscope or a scanning tunneling microscope.

42. The process according to claim 40 wherein the scanning probe has a width and the Spin-On Glass layer has a thickness that is equal to or less than the width of the scanning probe.

43. The process according to claim 39 wherein the electric field or electron beam source is positioned within about 1 μm of the Spin-On Glass layer.

44. The process according to claim 39 wherein the conductive layer is selected from the group consisting of: aluminum, titanium and doped polysilicon.

45. The process according to claim 36 wherein the electric field or electron beam source includes a plurality of scanning probes.

46. The process according to claim 39 wherein exposing the negative resist Spin-On Glass layer renders the exposed portion of the negative resist Spin-On Glass layer less susceptible to etching, the process further including the step of selectively removing the unexposed portion of the negative resist Spin-On Glass layer.

47. A process according to claim 39 wherein the negative resist Spin-On Glass is selected from the group consisting of phosphosilicate, sulfosilicate, borosilicate and selenium silicate Spin-On Glass.

48. A process for altering a susceptibility of a portion of a Spin-On Glass layer to etching comprising:

taking a substrate including a layer of negative resist Spin-On Glass which includes silicon bonded to a heteroatom selected from the group consisting of phosphorus, sulfur, boron and selenium;

projecting a field emission onto a portion of the negative resist Spin-On Glass layer to alter the susceptibility of the portion of the negative resist Spin-On Glass layer to etching.

49. The process according to claim 48 wherein the field emission is generated by a scanning electron microscope.

50. The process according to claim 48 wherein exposing the negative resist Spin-On Glass layer renders the exposed portion of the negative resist Spin-On Glass layer more susceptible to etching, the process further including the step of selectively removing the exposed portion of the negative resist Spin-On Glass layer.

51. A process according to claim 48 wherein the negative resist Spin-On Glass is selected from the group consisting of phosphosilicate, sulfosilicate, borosilicate and selenium silicate Spin-On Glass.

52. A process for altering a susceptibility of a portion of a Spin-On Glass layer to etching comprising:

taking a substrate including a layer of positive resist Spin-On Glass;

projecting a field emission onto a portion of the positive resist Spin-On Glass layer to alter the susceptibility of the portion of the positive resist Spin-On Glass layer to etching.

53. The process according to claim 52 wherein the field emission is generated by a scanning electron microscope.

54. The process according to claim 52 wherein exposing the positive resist Spin-On Glass layer renders the exposed portion of the positive resist Spin-On Glass layer more susceptible to etching, the process further including the step of selectively removing the exposed portion of the positive resist Spin-On Glass layer.

* * * * *